United States Patent
Clapp (10) Patent No.: US 7,536,065 B2
(45) Date of Patent: May 19, 2009

(54) ELECTRO-OPTIC GAP-CELL FOR WAVEGUIDE DEPLOYMENT

(75) Inventor: Terry Victor Clapp, Hertfordshire (GB)

(73) Assignee: Dow Corning Corporation, Inc., Auburn, MI (US)

( * ) Notice: Subject to any disclaimer, the term of this patent is extended or adjusted under 35 U.S.C. 154(b) by 16 days.

(21) Appl. No.: 10/564,133

(22) PCT Filed: Jul. 15, 2004

(86) PCT No.: PCT/GB2004/003108

§ 371 (c)(1),
(2), (4) Date: Jan. 19, 2007

(87) PCT Pub. No.: WO2005/010578

PCT Pub. Date: Feb. 3, 2005

(65) Prior Publication Data

US 2007/0274621 A1    Nov. 29, 2007

(30) Foreign Application Priority Data

Jul. 17, 2003    (GB)    ................... 0316825.9

(51) Int. Cl.
    *G02F 1/035*    (2006.01)
(52) U.S. Cl. .............................................. 385/3; 385/8
(58) Field of Classification Search ........................ None
    See application file for complete search history.

(56) References Cited

U.S. PATENT DOCUMENTS

| 5,311,606 | A | * | 5/1994 | Asakura et al. ................. 385/33 |
| 5,323,407 | A | | 6/1994 | Valette |
| 5,699,461 | A | * | 12/1997 | Minemoto et al. ............ 385/12 |
| 6,424,755 | B1 | | 7/2002 | Clapp |
| 6,459,533 | B1 | | 10/2002 | Clapp et al. .................. 359/578 |
| 6,526,193 | B1 | * | 2/2003 | He et al. ........................ 385/16 |
| 2006/0084753 | A1 | * | 4/2006 | Dumont et al. ............. 524/588 |
| 2007/0047872 | A1 | * | 3/2007 | Clapp ........................... 385/27 |

FOREIGN PATENT DOCUMENTS

| EP | 0 818 695 A2 | 1/1998 |
| EP | 1 065 534 A1 | 1/2001 |

OTHER PUBLICATIONS

Great Britain Application No. 0316825.9 Search Report (Oct. 28, 2003).

* cited by examiner

*Primary Examiner*—Sung H Pak
*Assistant Examiner*—Chad H Smith
(74) *Attorney, Agent, or Firm*—Williams, Morgan & Amerson (57) ABSTRACT

The present invention provides an electro-optic gap-cell for waveguide deployment, including a first optical transmission medium formed in at least a portion of a device layer, a second optical transmission medium formed in at least a portion of the device layer, and a slot formed in at least a portion of the device layer, wherein the slot has at least one curved edge, and wherein the slot is disposed adjacent to the first and second transmission media.

35 Claims, 10 Drawing Sheets

ELECTRO-OPTIC GAP-CELL FOR WAVEGUIDE DEPLOYMENT

This invention relates generally to an optical waveguide, and, more particularly, to an electro-optic gap-cell for deployment in an optical waveguide.

Photonics, the use of light to store, transmit, and/or process information, is rapidly increasing penetrating the market for commodity and high technology products. For example, optics is the transmission medium of choice for many metropolitan and local-area networks. The various optical devices used in photonics applications are often co-packaged or hybrid integrated with electronic devices. For example, a substrate may include one or more electronic or opto-electronic devices, such as transistors, resistors, and the like, as well as lasers, detectors and one or more waveguide devices for transmitting and/or receiving information in the form of light. The functionality of opto-electronic devices is expected to increase with the growing integration of the optical and electronic functions.

In some optical communications applications involving the transmission of data over a waveguide, it may be desirable to change the phase of the light propagating in the waveguide. For example, a controllable phase adjustment may be employed in optical attenuators, spectrally selective filters, interferometers, and the like, in which the light launched into one waveguide interferes with light propagating in a second waveguide. However, traditional methods of adjusting the phase of light propagating in a waveguide may not be well-suited for applications in which photonics devices are closely integrated with electronic devices.

One traditional method of controlling the phase of light propagating in an optical waveguide makes use of the fact that the effective refractive index of the waveguide depends on the temperature of the waveguide. For example, increasing the temperature of the waveguide may change the optical path length of the waveguide, as well as cause the waveguide to expand. The resultant stress and/or strain on the waveguide may further alter the waveguide's optical path length. Typically, a Joule heater is used to change the temperature of the optical waveguide and thereby change the optical path length of the waveguide. The sensitivity of temperature-dependent phase controllers is dependent upon the thermal coefficient of the path length in the waveguide materials. Although some materials may exhibit larger thermo-optic coefficients, these may be difficult to form into low-loss single mode waveguides, and so may not be well suited for use in optical waveguides.

Temperature-dependent phase controllers may also be difficult to include due to the substrate properties. First, thermo-optic methods of phase control may not respond fast enough to changes in the applied temperature because of heat sinking or thermal mass issues. In order to be integrated tightly with the electronic devices, which may also be included on the substrate, it is necessary to consider the whole thermal load of the object so created. Second, thermal crosstalk may reduce the accuracy, finesse, and control of the temperature-dependent phase controllers when more than one phase controller is included on the substrate. The range of phase expression of the temperature-dependent phase controller may also be reduced by thermal crosstalk. Although the reduction in the range of phase expression may be, at least in part, compensated for by increasing the range of temperatures applied to the phase controllers, increasing the temperature range typically results in a corresponding increase in power consumption of the device.

A slotted monolithic optical waveguide that utilizes an electro-optically active material to adjust the phase of light traveling in the waveguide is described in Clapp (U.S. Pat. No. 6,424,755). The electro-optically active material is positioned in a rectangular slot between two portions of the waveguide and two rectangular electrodes are deployed above the rectangular slot. Fringing electric fields are formed in the rectangular slot when a voltage is applied to the rectangular electrodes and a refractive index of the electro-optically active material may be varied by changing the voltage that is applied to the rectangular electrodes. However, the slotted monolithic optical waveguide described in Clapp has a number of disadvantages. For example, the rectangular slot includes a number of sharp corners that concentrate stresses and/or strains during operation, potentially leading to additional failure modes such as static fatigue fracture, failure of the material, and the like. For another example, the rectangular electrodes include a number of sharp corners that may undesirably concentrate the electric field.

In one aspect of the instant invention, an electro-optic gap-cell for waveguide deployment is provided, including a first optical transmission medium formed in at least a portion of a device layer, a second optical transmission medium formed in at least a portion of the device layer, and a slot formed in at least a portion of the device layer, wherein the slot has at least one curved edge, and wherein the slot is disposed adjacent to the first and second transmission media. A method of forming the device is also provided.

In another aspect if of the present invention, a phase adjusting element for use in a phase adjustment system having a slot formed therein proximate a waveguide is provided. The phase adjusting element includes a substrate having a shape selected to permit at least a portion of the phase adjusting element to be introduced into the slot, an opening formed in the substrate so that the opening is proximate the waveguide when the portion of the phase adjusting element is introduced into the slot, and at least one electrode formed proximate the slot. The phase adjusting element also includes an electro-optically active material deployed in the opening.

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1A:
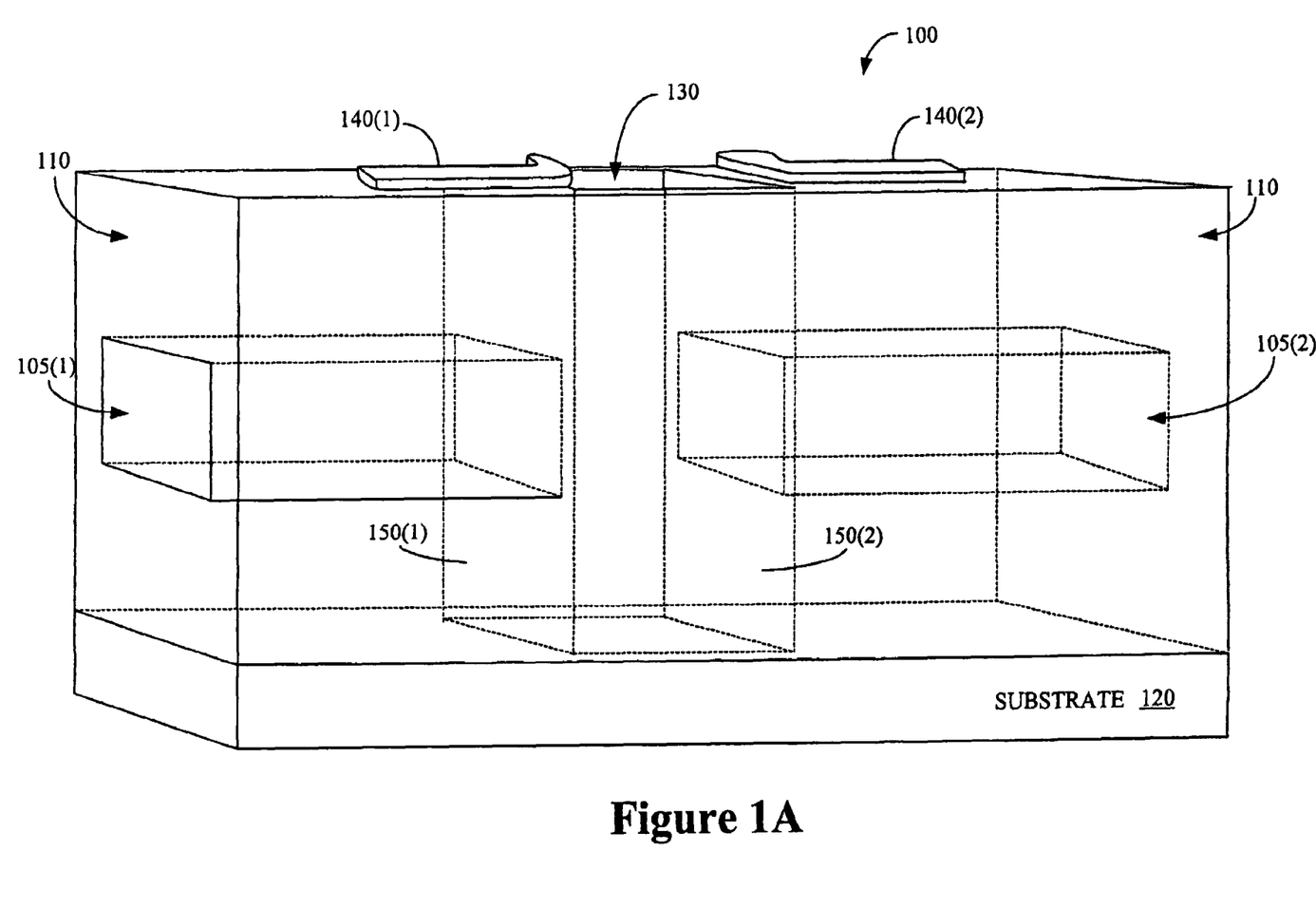
FIGS. 1A and 1B conceptually illustrate one embodiment of a first exemplary phase adjustment system.

FIG. 1A conceptually illustrates a perspective view of one embodiment of a first exemplary phase adjustment system 100. For example, the first exemplary phase adjustment system 100 may be used to introduce a controllable phase adjustment into light used in one or more optical devices, such as optical attenuators, spectrally selective filters, interferometers, and the like. In the illustrated embodiment, one or more waveguide portions 105(1-2) are formed within a device layer 110, commonly referred to in the art as a cladding layer, a waveguide core, a waveguide layer, a buffer, an under-claddings and the like. In alternative embodiments formed using other manufacturing processes known to those of ordinary skill in the art, the cladding layers may be semiconductors or other materials such as polymers, which are formed above a substrate 120, such as silicon, or other materials. For example, the cladding layers may be formed of glasses or polymers. It should be appreciated that the configuration of the phase adjustment system 100 is exemplary in nature, and that in alternative embodiments, the phase adjustment system 100 may include other components. For example, as discussed in detail below, the phase adjustment system 100 may include a variety of different optical transmission media, well-known to those of ordinary skill in the art, including ring resonators, gratings, "whispering gallery" objects, photonic crystals, and the like.

The waveguide portions 105(1-2) shown in the illustrated embodiment are formed of material having a refractive index that is larger than a refractive index of the device layer 110. For example, the waveguide portions 105(1-2) may be formed of doped silica having a refractive index of about 1.4557 and the device layer 110 may be formed of doped or un-doped silica having a refractive index of about 1.445. In other embodiments, the waveguide portions 105(1-2) and the device layer 110 may be formed of any desirable materials. In one embodiment, the device layer 110 may include an under cladding layer (not shown) formed, at least in part, beneath the waveguide portions 105(1-2) and an upper cladding layer (not shown) formed, at least in part, above the waveguide portions 105(1-2). In one embodiment, the upper cladding layer and the under cladding layer may not have the same refractive index.

In the illustrated embodiment, the slot 130 may be incised, cut, or etched in the layers 110 so that the waveguide portions 105(1-2) terminate proximate a slot 130 formed in the device layer 110. In one embodiment, the slot 130 is incised so that the evanescent field amplitude due to the signals propagating in the waveguide portions 105(1-2) at transverse edges 150 (1-2) of the slot 130 is less than −40 dB of the peak value. However, the precise location of the slot 130 and the desired evanescent field amplitude at the transverse edges 150(1-2) are matters of design choice. In one embodiment, the waveguide portions 105(1-2) and the slot 130 are formed having a relative angle such as to reduce reflections that may cause unwanted light to travel in either direction in the waveguide portions 105(1-2).

Figure 1B:
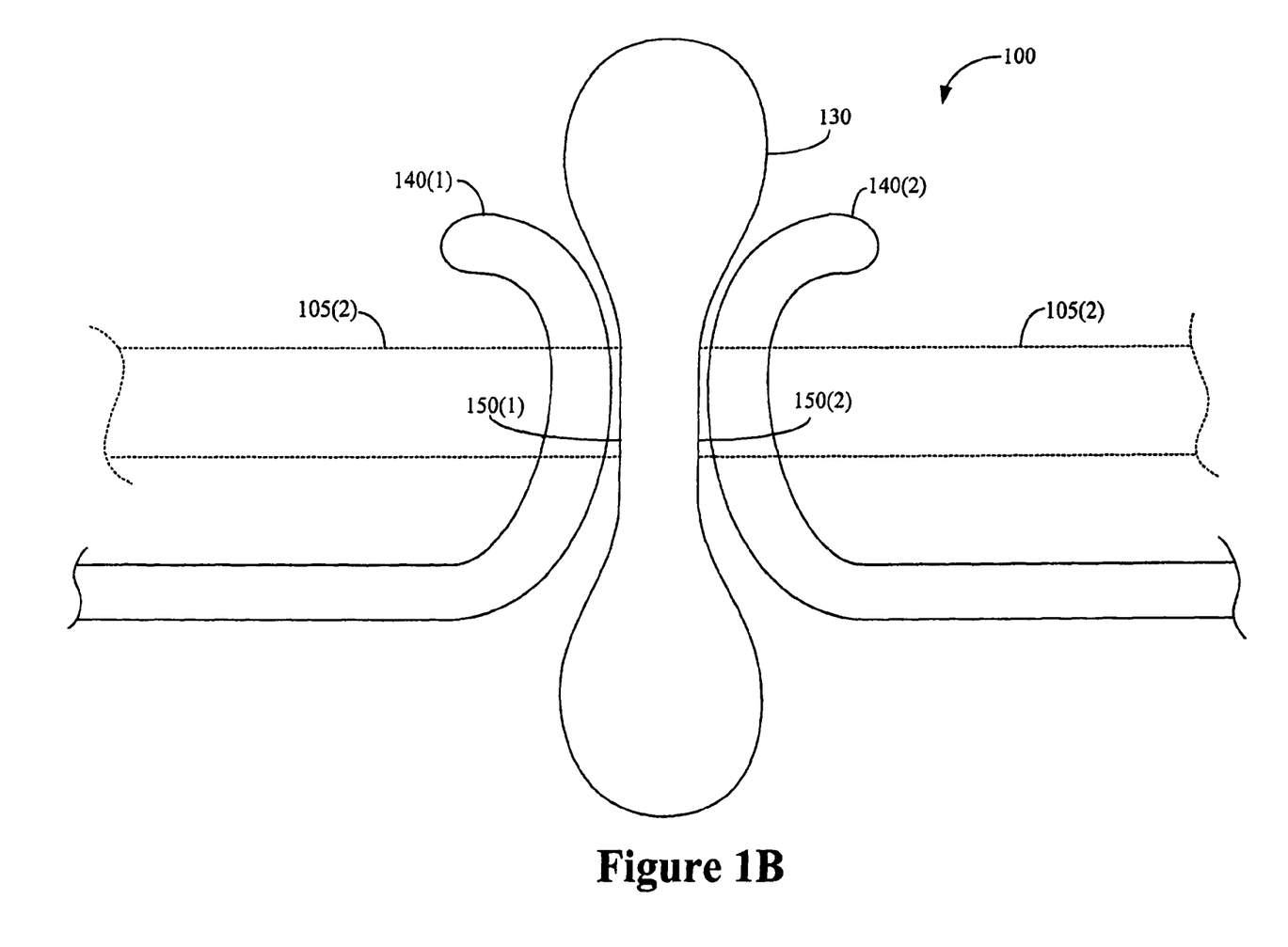

FIG. 1B conceptually illustrates a top down view of one embodiment of the first phase adjustment system 100. In the illustrated embodiment, the slot 130 is a so-called "dumbbell shape" opening in the device layers 110. However, in alternative embodiments, the slot 130 may be an opening having any desirable shape. In particular, the slot 130 may be formed so that one or more edges of the slot 130 are curved. For example, the slot 130 may be formed so that one or more of the edges of the slot 130 have a non-zero radius of curvature in the plane oriented approximately parallel to the surface of the device layers 110. By providing the slot 130 as described above, the stresses and/or strains on the material surrounding the slot 130 produced during operation may be reduced, which may reduce the likelihood of failure modes such as static fatigue fracture, failure of the material, and the like.

Although not necessary for the practice of the present invention, one or more surfaces of the slot 130 may be treated to add, remove, or change properties of the one or more surfaces. In one embodiment, one or more of the surfaces of the slot 130 may be treated to form a preferred molecular orientation at one or more of the surfaces of the slot 130 or on a separate element that is inserted into the slot 130. In one alternative embodiment, at least one of an interpenetrating polymer matrix, a carbon nanotube, and an auxiliary dopant may be formed or delivered from the material inserted in the slot 130 and interact with one or more of the surfaces of the slot 130. Other treatments of the slot 130, which may be used in alternative embodiments, include pre-treatments that effect surface energy changes, such as silane and/or derivatives, and additives formulated within the optical material and/or separately that migrate to the surface of the slot 130. In other alternative embodiments, the slot 130 may be treated with materials such as chromophores, stabilization agents, refractive index modifiers, or other agents designed to introduce beneficial properties such as higher electro-optic and/or non-linear optical properties and/or preferential fluorescence and/or light emission properties.

As shown in FIGS. 1A and 1B, a pair of electrodes 140(1-2) may be formed on the device layer 110 so that a portion of each of the electrodes 140(1-2) is substantially adjacent a respective one of the transverse edges 150(1-2) of the slot 130. In the illustrated embodiment, the electrodes 140(1-2) are curved into a hook shape so that one or more edges of the electrodes 140(1-2) are curved. In one embodiment, the electrodes 140(1-2) are formed so that one or more of the edges have a non-zero radius of curvature in the plane of the layers 110. However, in alternative embodiments, more or fewer electrodes 140(1-2) may be formed on the device layer 110 and the electrodes 140(1-2) may have any desirable shape. Furthermore, in various other alternative embodiments such as will be described in detail below, portions of the electrodes 140(1-2) may be formed or introduced in or into the slot 130. For example, the electrodes 140(1-2) may not be formed on the device layer 110 and may instead be formed or introduced within (or substantially within) the slot 130.

In one embodiment, the slot 130 may be filled with an electro-optically active material (not shown). As will be appreciated by those of ordinary skill in the art, the molecular axis of the electro-optically active material in the slot 130 can be adjusted by changing the relative potential that is applied to the electrodes 140(1-2). For example, the orientation of the molecular axis may be changed from one in which the refractive index of the electro-optically active material is at about a maximum to one in which the refractive index of the electro-optically active material is at about a minimum. For another example, the polarization-dependent refractive index of a birefringent electro-optically active material may be changed by changing the potential that is applied to the electrodes 140(1-2). Consequently, the phase, amplitude, and/or polarization of light propagating through the slot 130 may be adjusted.

In one embodiment, the electro-optically active material may be a liquid that may be introduced into the slot 130. For example, the electro-optically active material may be a liquid crystal, a polymer-dispersed liquid crystal, an inter-penetrating polymer network, and the like. The polymer-dispersed liquid crystal may, in alternative embodiments, include a carbon-based polymer, a heterogeneous molecular system, a siloxane, a ladder siloxane, a silicon-containing polymer, a dendrimer, a supramolecular assembly, and the like. Alternatively, as described in detail below, the electro-optically active material may be a part of a separate element that may be inserted into the slot 130.

Figure 2:
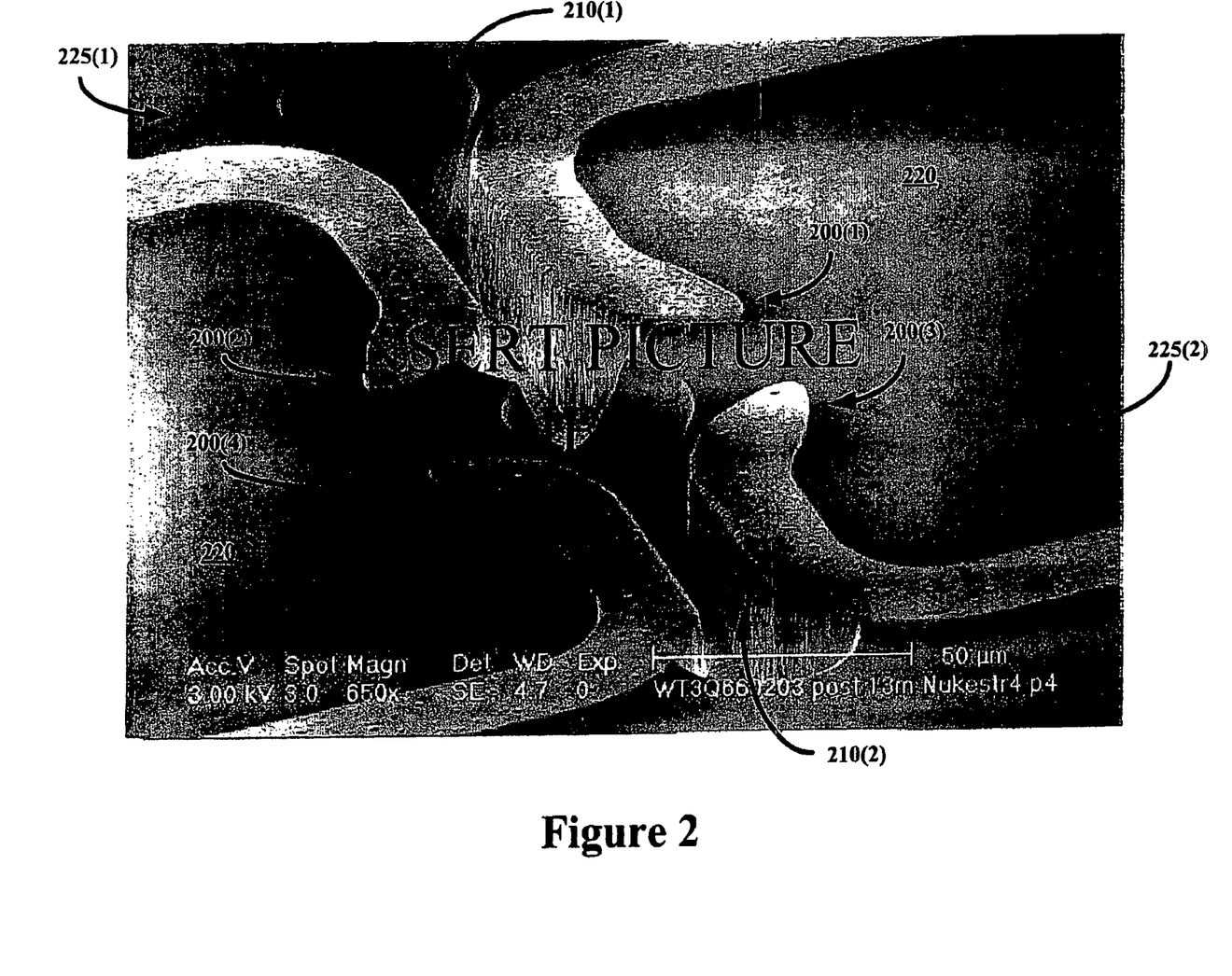
FIG. 2 shows an image of electrodes and slots formed in a buried waveguide structure of a first exemplary phase adjustment system such as that illustrated in FIGS. 1A and 1B.

FIG. 2 shows an image of electrodes 200(1-4) and slots 210(1-2) formed in layers 220. In the illustrated embodiment, the electrodes 200(1-2) and the slot 210(1) are a portion of a first phase adjustment system 225(1) for a first waveguide (not shown) and the electrodes 200(3-4) and the slot 210(2) are a portion of a second phase adjustment system 225(2) for a second waveguide (not shown). As discussed above, one or more edges of the electrodes 200(1-4) and the slots 210(1-2) may be curved. For example, one or more edges of the electrodes 200(1-4) and/or the slots 210(1-2) may have a non-zero radius of curvature in the plane of the layers 110.

Figure 3A:
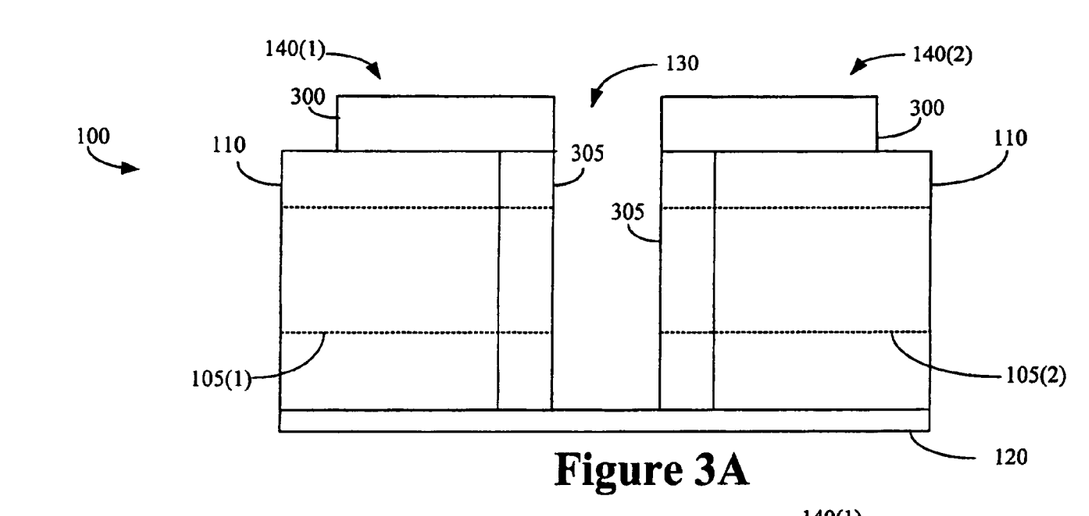
FIGS. 3A-E conceptually illustrate four alternative embodiments of the electrodes.

FIGS. 3A-E conceptually illustrate four alternative embodiments of the phase adjustment system 100 having alternative arrangements of the electrodes 140(1-2). FIG. 3A shows a first alternative embodiment of the phase adjustment system 100, as viewed from a direction approximately perpendicular to the waveguide portions 105(1-2), having a first alternative arrangement of the electrodes 140(1-2). In the first embodiment shown in FIG. 3A, a first portion 300 of each of the electrodes 140(1-2) is formed above the cladding layer 110 and adjacent the slot 130. A second portion 305 of the electrodes 140(1-2) is formed adjacent the cladding layer 110 and inside the slot 130. In one embodiment, the first portion 300 of the electrodes 140(1-2) may be formed of the same material as the second portion 305 of the electrodes 140(1-2). For example, the first and second portions 300, 305 of the electrodes 140(1-2) may be formed of a metal, a metal oxide, and the like. In one alternative embodiment, the first portion 300 of the electrodes 140(1-2) may not be formed of the same material as the second portion 305 of the electrodes 140(1-2). For example, the second portion 305 of the electrode 140(1-2) may be formed of indium tin oxide or another substantially transparent conducting material to form an electrode that covers the waveguide faces and through which the propagating signal may pass.

Figure 3B:
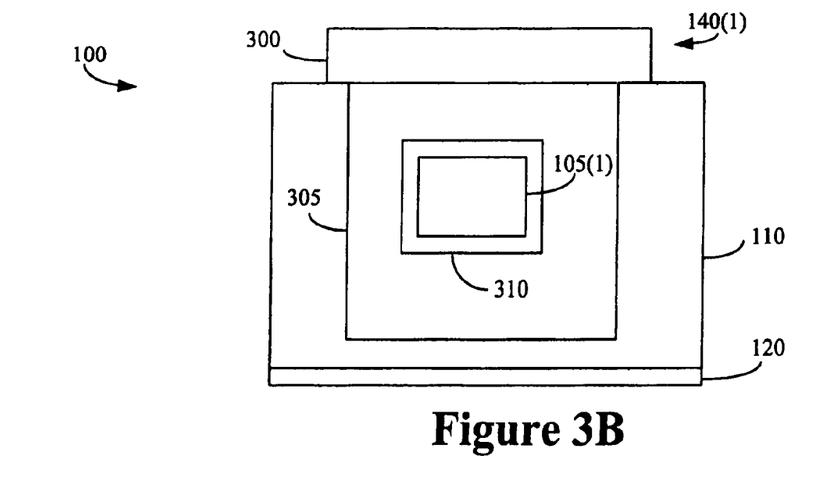

FIG. 3B conceptually illustrates the first embodiment of the electrodes 140(1-2), as viewed along an axis of the waveguide portions 105(1-2). An opening 310 in the electrodes 140(1-2) may be provided adjacent the ends of the waveguide portions 105(1-2) to allow light to travel through the electrodes 140(1-2). In one embodiment, the opening 310 may allow the waveguide portions 105(1-2) to pass through the electrodes 140(1-2). However, in, alternative embodiments, the waveguide portions 105(1-2) may not pass through the electrodes 140 (1-2). The first arrangement of the electrodes 140(1-2) may be used to provide an electric field in the slot 130 that is substantially horizontal.

Figure 3C:
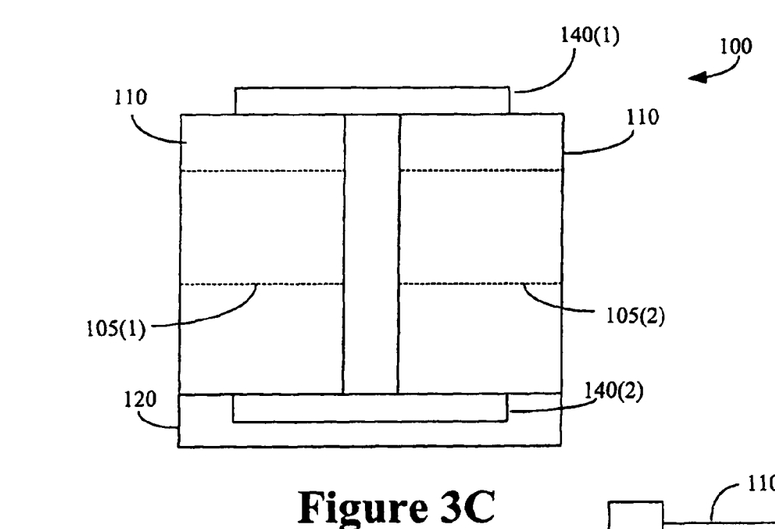

FIG. 3C shows a second alternative embodiment of the phase adjustment system 100, as viewed from a direction approximately perpendicular to the waveguide portions 105 (1-2), having a second alternative arrangement of the electrodes 140(1-2). In the second embodiment shown in FIG. 3C, the first electrode 140(1) is formed above the cladding layer 110 and above the slot 130. The second electrode 140(2) is formed below the cladding layer 110 and below the slot 130. For example, the second electrode 140(2) may be formed in the substrate 120 before forming the cladding layer 110 above the substrate 120. The second arrangement of the electrodes 140(1-2) may be used to provide an electric field in the slot 130 that is substantially vertical.

Figure 3D:
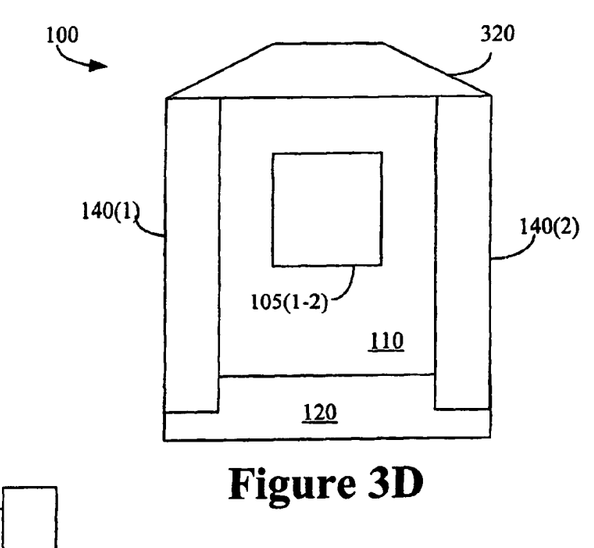

FIG. 3D shows a third embodiment of the phase adjustment system 100, as viewed from a direction approximately perpendicular to the waveguide portions 105(1-2), having a third alternative arrangement of the electrodes 140(1-2). In the third embodiment shown in FIG. 3D, the electrodes 140 (1-2) are coupled to a carrier 320. In one embodiment, the electrodes 140 (1-2) and the carrier 320 may be assembled prior to forming the phase adjustment system 100 and then inserted into the phase adjustment system 100 when so desired. The third embodiment of the electrodes 140(1-2) may be used to provide an electric field in the slot 130 that is substantially horizontal.

Figure 3E:
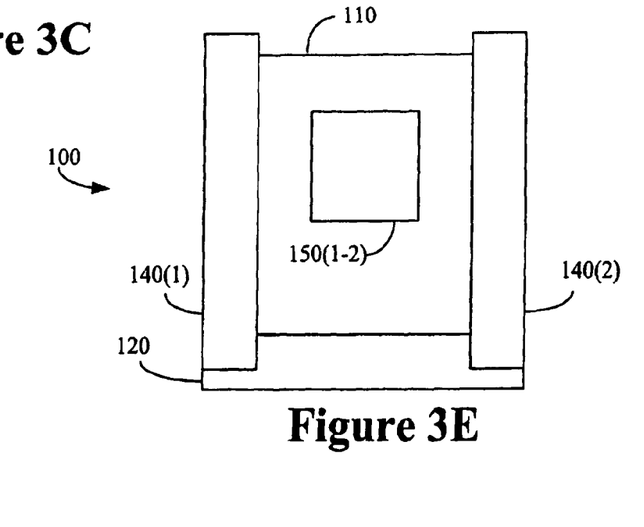

FIG. 3E shows a fourth embodiment of the phase adjustment system 100, as viewed from a direction approximately perpendicular to the waveguide portions 105(1-2), having a fourth alternative arrangement of the electrodes 140(1-2). In the fourth embodiment shown in FIG. 3E, the electrodes 140 (1-2) are formed in the cladding layer 110 and substantially perpendicular to the waveguide portions 105(1-2). For example, the electrodes 140(1-2) may be vias formed in the cladding layer 110. The fourth embodiment of the electrodes 140(1-2) may be used to provide an electric field in the slot 130 that is substantially horizontal.

Figure 4:
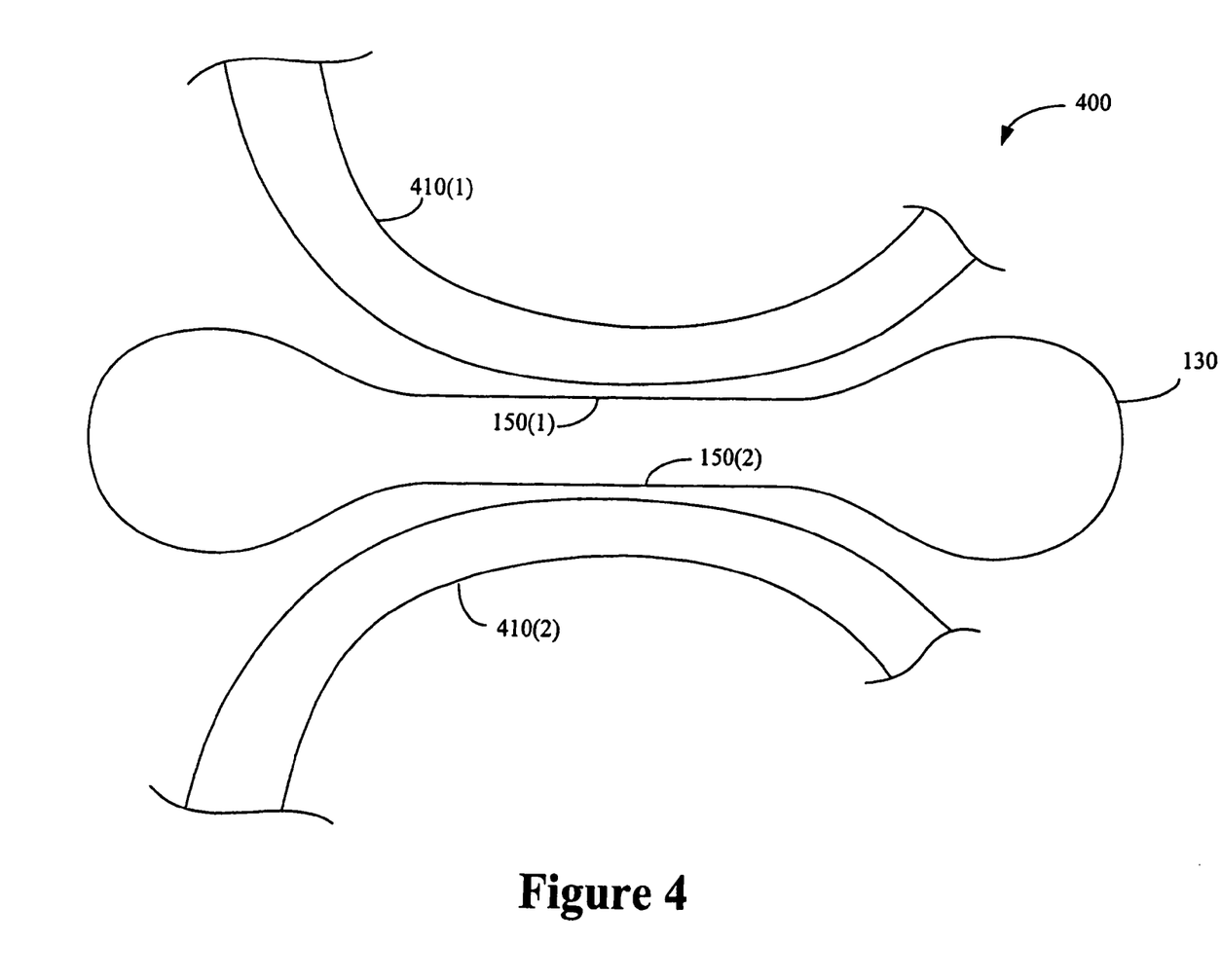
FIG. 4 conceptually illustrates one embodiment of a second exemplary phase adjustment system.

FIG. 4 conceptually illustrates one embodiment of a second exemplary phase adjustment system 400. In the embodiment illustrated in FIG. 4, at least a part of the waveguide portions 410(1-2) are oriented to be approximately parallel to the transverse edges 150(1-2) of the slot 130 thereby allowing a fraction of the light propagating in the waveguide portion 410(1) to be transmitted to the waveguide portion 410(2). For example, the second exemplary phase adjustment system 400 may be a coupled wave device such as a planar waveguide, a Mach-Zehnder interferometer, and the like. The waveguide portions 410(1-2) may terminate near the slot 130. However, this is not necessary for the practice of the present invention. In alternative embodiments, the waveguide portions 410(1-2) may not terminate near the slot 130.

As in the first exemplary phase adjustment system 100 of FIG. 1, the slot 130 in the second phase adjustment system 400 may be incised, etched, or cut into the layers (not shown) so that the evanescent field amplitude due to the signals propagating in the waveguide portions 410(1-2) at transverse edges 150(1-2) of the slot 130 is less than −40 dB of the peak value. However, the precise location of the slot 130 and the desired evanescent field amplitude at the transverse edges 150(1-2) are matters of design choice.

Figures 5A, 5B:
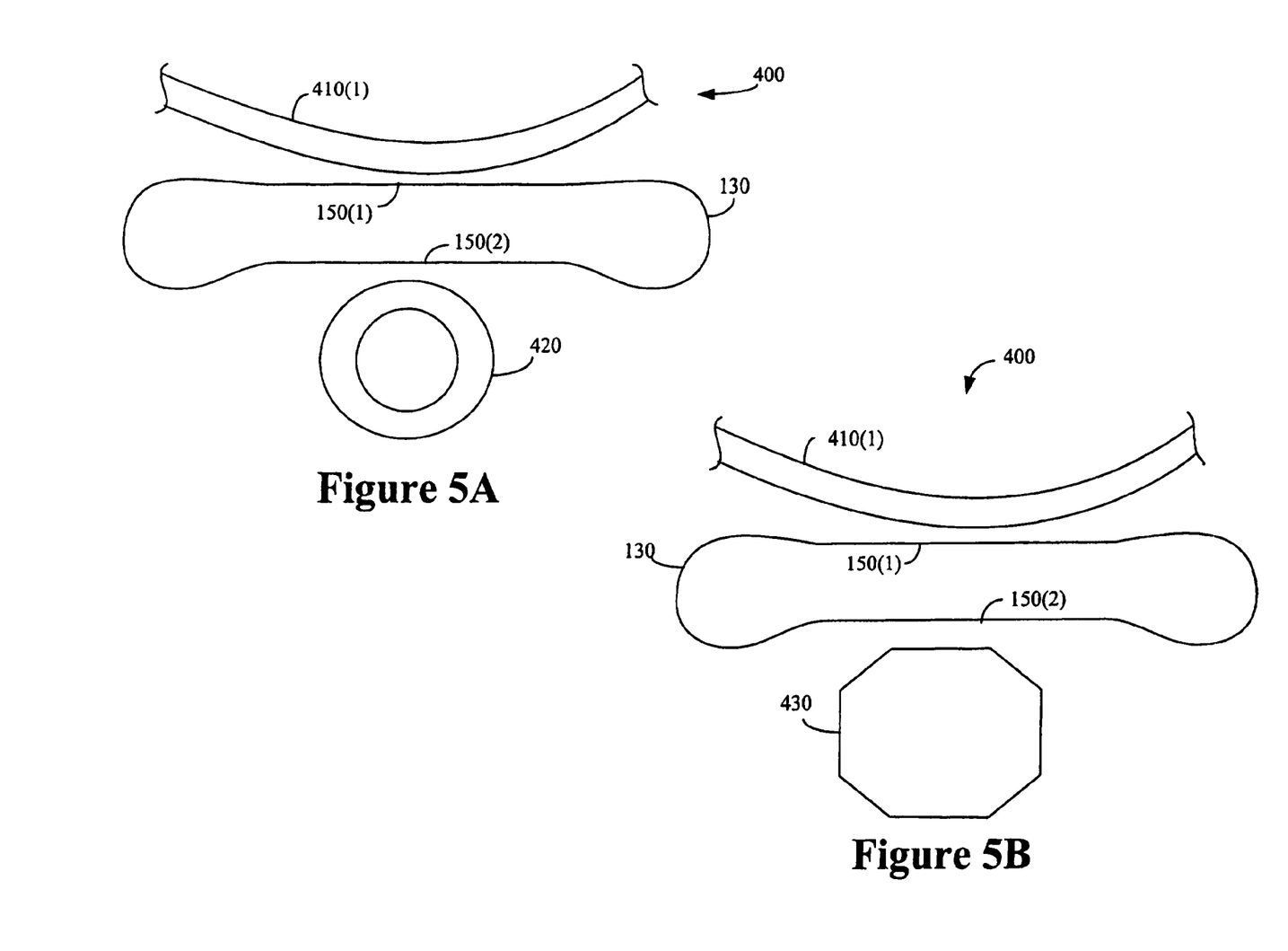
FIGS. 5A-E conceptually illustrate five alternative embodiments of the second exemplary phase adjustment device.
Figures 5C, 5D:
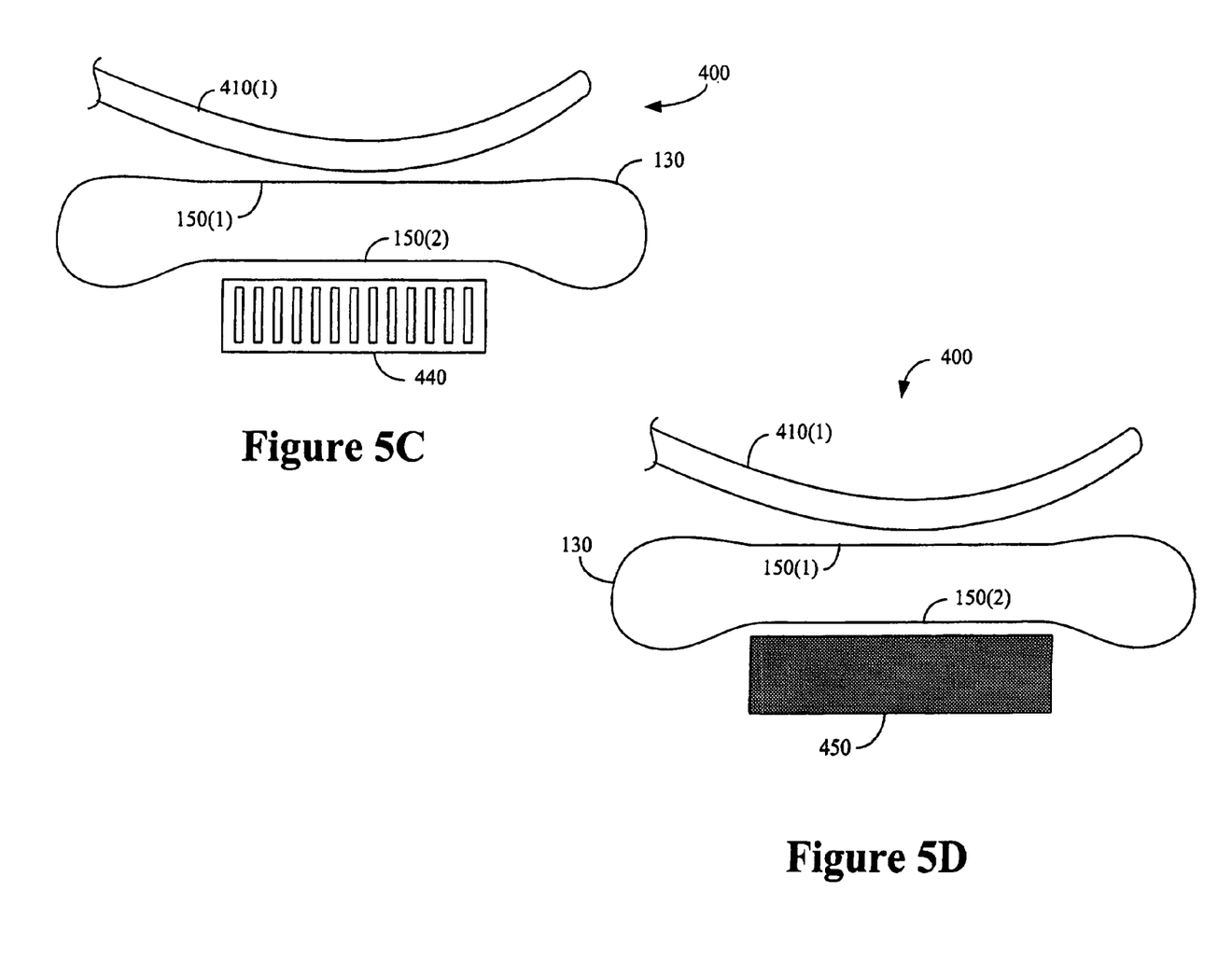
Figure 5E:
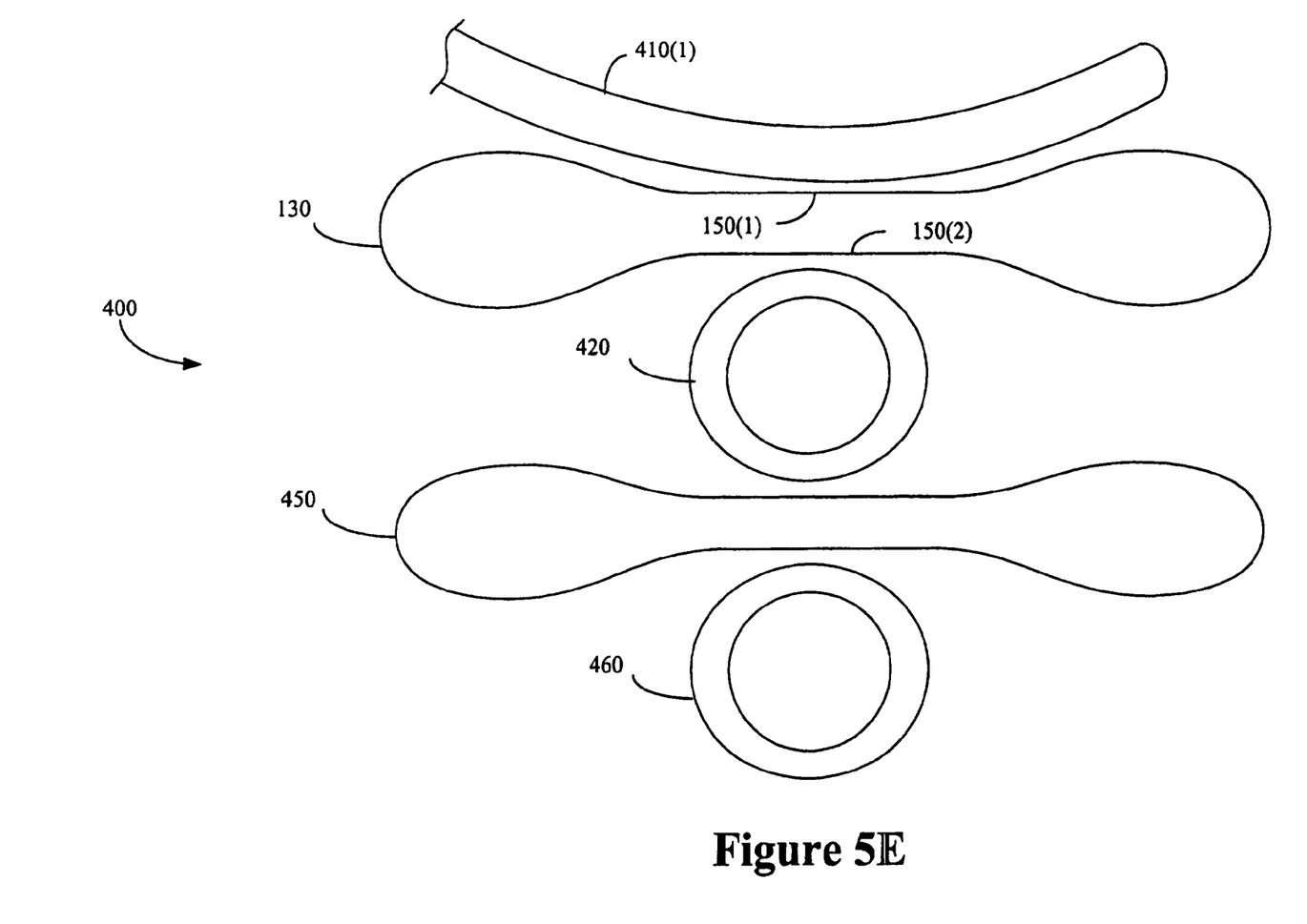

FIGS. 5A-E conceptually illustrate five alternative embodiments of the second exemplary phase adjustment system 400. Instead of allowing the transmission of light from the waveguide portion 410(1) to the waveguide portion 410 (2), the five alternative embodiments shown in FIGS. 5A-E may allow light to be transmitted from the waveguide portion 410(1) to a variety of well-known optical devices for storage, modification, and/or transmission. In FIGS. 5A-E, the waveguide portion 410(1) is oriented so that at least a part is approximately parallel to the transverse edge 150(1) of the slot 130. In FIG. 5A, a ring resonator 420 is deployed proximate to the transverse edge 150(2) of the slot 130. In FIG. 5B, a "whispering gallery" object 430 is deployed proximate to the transverse edge 150(2) of the slot 130. In FIG. 5C, a grating 440, such as a diffraction grating, is deployed proximate to the transverse edge 150(2) of the slot 130. In FIG. 5D, a photonic element 450, such as a photonic crystal or a photonic band-gap device, is deployed proximate to the transverse edge 150(2) of the slot 130. In FIG. 5E, a first ring resonator 420 is deployed proximate to the transverse edge 150(2) of the slot 130. A second slot 450 is deployed between the first ring resonator 420 and a second ring resonator 470, so that a first fraction of the light propagating in the waveguide portion 410(1) may be transmitted to the first ring and resonator 420 and a second fraction of the light may be transmitted to the second ring and resonator 470 and conversely.

Figure 6:
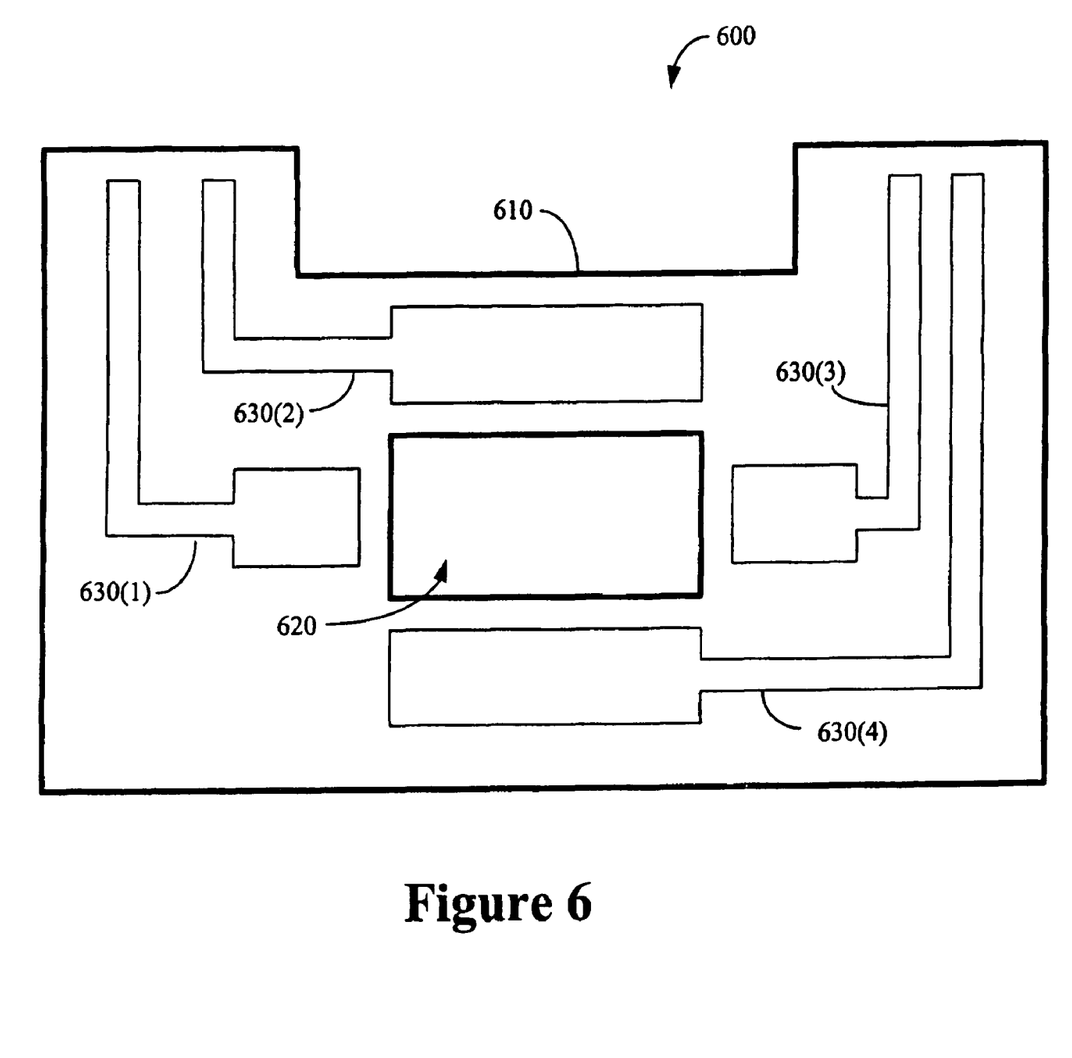
FIG. 6 conceptually illustrates one embodiment of a phase adjusting element that may be used in the first or second exemplary phase adjustment systems shown in FIGS. 1A-B and 4.

FIG. 6 conceptually illustrates one embodiment of a phase adjusting element 600 that may be inserted into the slot 130. For example, the phase adjusting element 600 may be inserted into the slot 130, and removed from the slot 130, by sliding. In one embodiment, the phase adjusting element 600 includes a substrate 610, which may be formed from materials such as Mylar, silicone, and the like. An opening 620 may be formed in the substrate 610. The opening 620 may be formed in the substrate 610 such that the opening 620 is positioned substantially adjacent to and substantially aligned with the waveguide when the phase adjusting element 600 is inserted into the slot 130. When deployed in this manner, at least a portion of the light propagating in the waveguide may pass through the opening 620.

An electro-optically active material may be deployed in the opening 620. In various embodiments, as discussed above, the electro-optically active material may be liquid crystal, polymer-dispersed liquid crystal, a polymer stabilized liquid crystal, an inter-penetrating polymer network, and the like. In various alternative embodiments, the phase adjusting element 600 introduced into the slot 130 comprises a material that becomes increasingly electro-optic when introduced into the slot 130.

Although not necessary for the practice of the present invention, one or more electrodes 630(1-4) may be formed in or on the substrate 610. In one embodiment, electric potentials may be provided to the electrodes 630(1-4) to orient the molecular axis, as described above. One or more conductive traces (not shown) may be formed in the cladding layer 110 and then electrically coupled to the electrodes 630(1-4) by, e.g., soldering. Persons of ordinary skill in the art will appreciate that more or fewer electrodes 630(1-4) may be formed in or on the substrate 610. Furthermore, the electrodes 630(1-4) may be positioned at any desirable location on the substrate 610. In particular, the electrodes 630(104) may be positioned to provide a desired orientation of the fringing electric field in the opening 620. In one embodiment, the electrodes 630(1-4) may replace the electrodes 140(1-2) shown in FIGS. 1A-B.

The invention claimed is:

1. An apparatus, comprising:
a first optical transmission medium formed in at least a portion of a device layer;
a second optical transmission medium formed in at least a portion of the device layer; and
a slot formed in at least a portion of the device layer, wherein the slot has at least one curved edge, and wherein the slot is disposed adjacent to the first and second transmission media, wherein the slot is adapted to receive a phase adjusting element and wherein the phase adjusting element comprises:
a substrate having a shape selected to permit the phase adjusting element to be inserted into the slot;
an opening formed in the substrate so that the opening is proximate the waveguide when the phase adjusting element is inserted in the slot; and
an electro-optically active material deployed in the opening.

2. The apparatus of claim 1, comprising at least one electrode that is deployed on the substrate.

3. The apparatus of claim 2, further comprising at least one conductive element coupled to the at least one electrode deployed on the substrate of the phase adjusting element.

4. The apparatus of claim 1 wherein the phase adjusting element comprises an electro-optically active liquid introduced into the slot, said electro-optically active liquid having at least one molecular axes that can be adjusted by changing a potential applied across said electro-optically active liquid.

5. The apparatus of claim 1, wherein the phase adjusting element introduced into the slot comprises a material that becomes increasingly electro-optic when introduced into the slot.

6. The apparatus of claim 1, wherein a surface of the slot is modified to provide at least one of an interpenetrating polymer matrix, a carbon nanotube, an auxiliary dopant, and a surface treatment resulting from an introduced material.

7. The apparatus of claim 1, wherein a surface of the slot has a preferred molecular orientation.

8. The apparatus of claim 1, wherein the at least one curved edge comprises at least one edge having a non-zero radius of curvature in a plane substantially parallel to a surface of the substrate.

9. The apparatus of claim 1 where in the first optical transmission medium forms a waveguide.

10. The apparatus of claim 9 wherein the waveguide is oriented approximately perpendicular to a transverse edge of the slot.

11. The apparatus of claim 10, wherein the waveguide terminates approximately at the transverse edge of the slot.

12. The apparatus of claim 9, wherein the waveguide and the slot are formed at a relative angle such as to reduce reflections causing unwanted light to travel in either direction in the waveguide.

13. The apparatus of claim 9, wherein at least a portion of the waveguide is oriented approximately parallel to a transverse edge of the slot.

14. The apparatus of claim 1, where in the second optical transmission medium is at least one of a waveguide, a ring resonator, a whispering gallery mode object, a grating defined cavity, a photonic crystal, and a photonic band-gap object.

15. The apparatus of claim 1, further comprising a third optical transmission medium.

16. The apparatus of claim 15, wherein the third optical transmission medium is at least one of a waveguide, a ring resonator, a whispering gallery mode object, a grating defined cavity, a photonic crystal, and a photonic band-gap object.

17. An apparatus, comprising:
a first optical transmission medium formed in at least a portion of a device layer;
a second optical transmission medium formed in at least a portion of the device layer;
a slot formed in at least a portion of the device layers, wherein the slot has at least one curved edge having a non-zero radius of curvature, and wherein the slot is disposed adjacent to the first and second transmission media;

a phase adjusting element deployed in the slot; and
at least one electrode deployed proximate the slot, the at least one electrode being adapted to provide at least a portion of a variable electric field within the slot, the phase adjusting element being responsive to the variable electric field so that at least one of a phase, amplitude, or polarization of light propagating through the slot can be adjusted by varying the variable electric field, wherein the at least one electrode has at least one curved electrode edge.

18. The apparatus of claim 17, wherein the at least one electrode has at least one electrode edge having a non-zero radius of curvature.

19. The apparatus of claim 18, wherein the at least one electrode edge having a non-zero radius of curvature comprises at least one electrode edge having a non-zero radius of curvature in a plane substantially parallel to a surface of the device layer.

20. An apparatus, comprising:
a substrate;
a device layer formed above the substrate;
a waveguide formed in at least a portion of the device layer;
a slot formed in at least a portion of the device layer and having at least one edge having a non-zero radius of curvature in a plane substantially parallel to a surface of the device layer, wherein the slot allows at least a portion of light propagating in the waveguide to be transmitted from the waveguide to another transmission medium;
at least one electrode deployed proximate the slot, the at least one electrode having at least one electrode edge having a non-zero radius of curvature in a plane substantially parallel to a surface of the device layer and being capable of providing at least a portion of a variable electric field in the slot; and
a phase adjusting element deployed in the slot.

21. The apparatus of claim 20, wherein the phase adjusting element comprises:
a substrate having a shape selected to permit the phase adjusting element to be inserted into the slot;
an opening formed in the substrate so that the opening is proximate the waveguide when the phase adjusting element is inserted in the slot; and
an electro-optically active material deployed in the opening.

22. The apparatus of claim 20, wherein the at least one electrode is deployed on the substrate of the phase adjusting element.

23. The apparatus of claim 20, wherein the slot allows at least a portion of the light propagating in the waveguide to be transmitted from the waveguide to at least one of a waveguide, a ring resonator, a whispering gallery mode object, a grating defined cavity, a photonic crystal, and a photonic band-gap object.

24. A method, comprising:
forming a first optical transmission medium in at least a portion of the device layer;
forming a second optical transmission medium in at least a portion of the device layer;
forming a slot in at least a portion of the device layer, wherein the slot has at least one curved edge having a non-zero radius of curvature, and wherein the slot is disposed adjacent to the first and second transmission media;
deploying a phase adjusting element within the slot; and
deploying at least one electrode having at least one curved edge proximate the slot such that the at least one electrode is capable of providing at least a portion of a variable electric field in the slot.

25. The method of claim 24, wherein forming the first optical transmission medium comprises forming a waveguide oriented approximately perpendicular to a transverse edge of the slot.

26. The method of claim 24, wherein forming the slot comprises forming the slot such that the waveguide terminates proximate the approximately transverse edge of the slot.

27. The method of claim 24, wherein forming the first optical transmission medium comprises forming a waveguide, wherein at least a portion of the waveguide is oriented approximately parallel to a transverse edge of the slot.

28. The method of claim 24, where forming the second optical transmission medium comprises forming at least one of a waveguide, a ring resonator, a whispering gallery mode object, a grating defined cavity, a photonic crystal, and a photonic band-gap object.

29. The method of claim 24, further comprising forming a third optical transmission medium in the substrate.

30. The method of claim 24, wherein deploying the phase adjusting element within the slot comprises deploying an electro-optically active element in the slot, said electro-optically active element having at least one molecular axis that can be adjusted by changing a potential applied across said electro-optically active element.

31. The method of claim 30, wherein deploying the electro-optically active element in the slot comprises introducing at least one of a liquid crystal and a polymer dispersed liquid crystal in the slot.

32. The method of claim 30, wherein deploying the electro-optically active element in the slot comprises inserting the phase adjusting element in the slot.

33. The method of claim 30, further comprising forming at least one of an interpenetrating polymer matrix, a carbon nanotube, and an auxiliary dopant within the electro-optically active element introduced into the slot.

34. The method of claim 33, wherein the at least one of the interpenetrating polymer matrix, the carbon nanotube, and the auxiliary dopant extend to a surface of the slot.

35. The method of claim 30, further comprising treating the slot using at least one of silane, silane derivatives, additives that migrate to the surface of the slot, chromophores, stabilization agents, and refractive index modifiers.

* * * * *